SINGLE SIDE BAND MODULATOR SYSTEM

Filed June 29, 1964 2 Sheets-Sheet 1

INVENTOR.
DAVID SILVERMAN
BY FOWLER, KNOBBE & GAMBRELL
ATTORNEYS.

INVENTOR.
DAVID SILVERMAN
BY FOWLER, KNOBBE & GAMBRELL
ATTORNEYS.

3,319,189
SINGLE SIDE BAND MODULATOR SYSTEM
David Silverman, Anaheim, Calif., assignor to Beckman Instruments, Inc., a corporation of California
Filed June 29, 1964, Ser. No. 378,638
5 Claims. (Cl. 332—45)

The present invention relates to an improved single side band modulator system, and, more particularly, to such a system utilizing the multiplying action of Hall effect devices.

It is the purpose of the present invention to provide a single side band modulator system characterized by a substantial reduction in circuit complexity over prior art single side band systems.

It is another object of the present invention to provide a single side band modulator system employing Hall effect elements which does not require additional filter or phase shift networks.

Other and further objects, features, and advantages of the invention will become apparent as the description proceeds.

In brief, a preferred embodiment of the present invention comprises first and second Hall elements and their associated electromagnetic means for establishing respective magnetic fields through the Hall elements. The input terminations of the first Hall element and the electromagnetic means of the second Hall element are energized in accordance with the carrier frequency voltage. The input terminations of the second Hall element and the electromagnetic means of the first Hall element are energized in accordance with the modulating frequency voltage. The Hall element output voltages comprise respective modulation products which, when algebraically added, cancel either the upper or lower sidebands. The desired single side band intermodulation product is thus achieved without the use of tuned circuits or filters.

In the preferred embodiment just described, the inherent phase shift in the magnetic circuits associated with each of the Hall elements is utilized for achieving a substantially 90° phase shift of the input carrier and modulating frequency signals. In another embodiment described hereinafter, additional Hall elements are used for achieving this 90° phase shift. This latter embodiment likewise does not require the use of tuned circuits and filters.

A more thorough understanding of the invention may be obtained by a study of the following detailed description taken in conjunction with the accompanying drawings in which.

Figure 1:
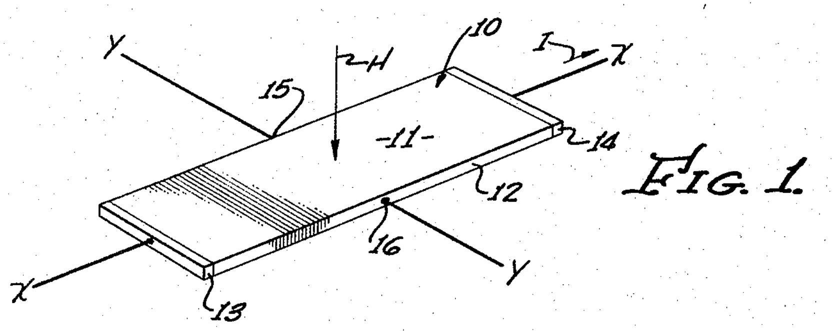
FIG. 1 is a perspective view of a representative Hall element.

Referring now to the embodiment of a Hall effect device shown in FIG. 1, Hall element 10 comprises a thin layer of semiconductor material 11, in which the Hall effect phenomena takes place, supported on a dielectric substrate 12. Attached to the semiconductor layer are input control current terminations 13, 14 and Hall voltage output terminations 15, 16 defining mutually orthogonal axes. An exemplary type of Hall element is constructed from the compounds indium antiminide or indium arsenide which are evaporated upon the substrate 12 in accordance with the teachings of U.S. Patent No. 3,082,124, entitled, "Method of Making Thin Layer Semiconductor Devices," assigned to Beckman Instruments, Inc., assignee of the present invention. Substrate 12 is advantageously constructed in accordance with the teachings of the copending application entitled, "Improvements for Substrate Configurations for Hall Elements," Ser. No. 373,617, assigned to Beckman Instruments, Inc., assignee of the present invention.

The classic Hall voltage equation may be written $$V_H = KI_cH \qquad (1)$$

where $V_H$=Hall voltage (2)
K=Hall element sensitivity (3)
$I_c$=control current (4)
H=flux density (5)

when the flux density vector H is applied an axis mutually orthogonal to the control current and Hall voltage axes. Accordingly, the Hall voltage is equivalent to the product of the control current and the magnetic field directed through the Hall element.

Figures 2, 3:
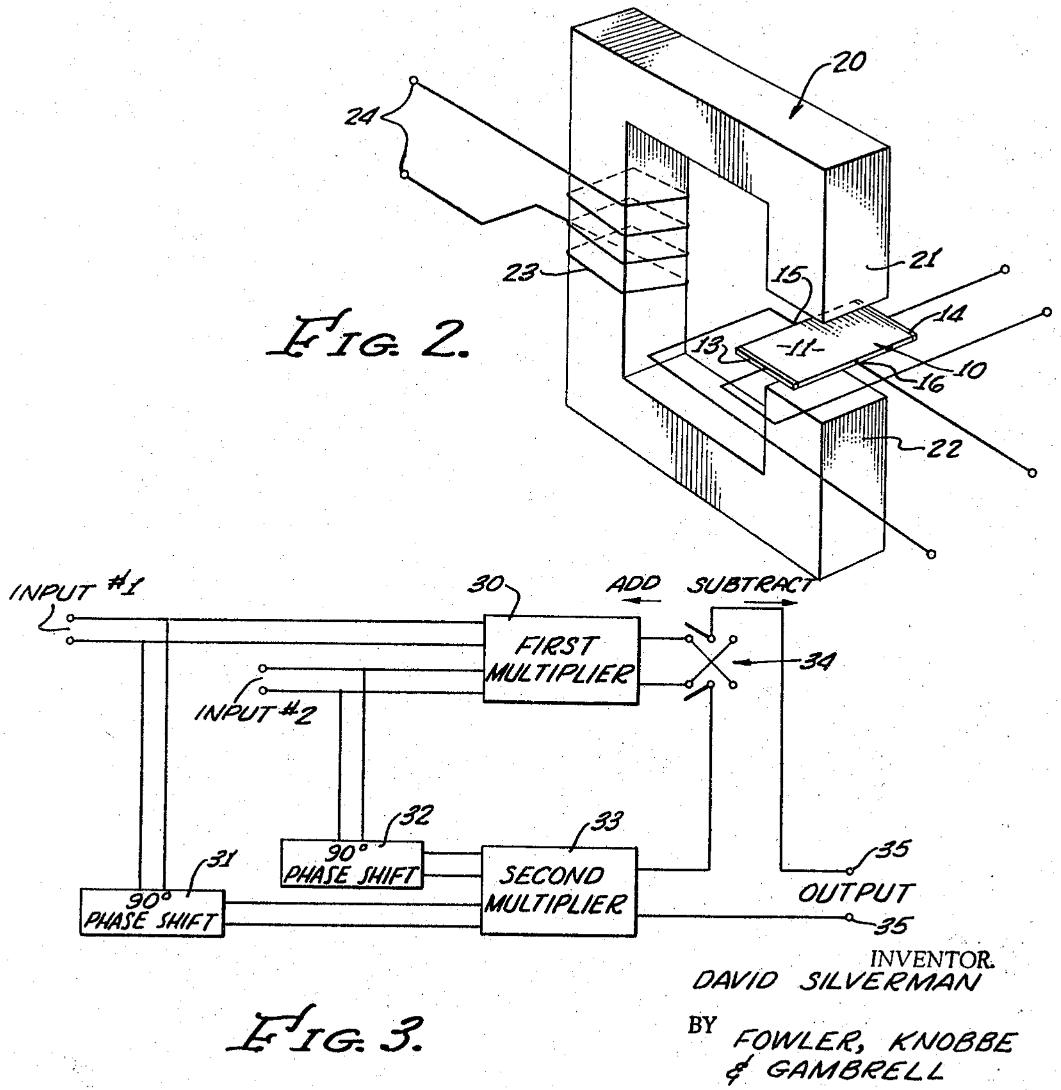
FIG. 2 is a perspective view illustrating a Hall effect device and associated magnetic field producing structure.
FIG. 3 is a block diagram schematic illustrating the mode of operation of one embodiment of the present invention.

A Hall effect element and its associated magnetic structure is shown in FIG. 2. Magnetic field generating means includes an electromagnetic structure 20 having poles 21, 22 and coil 23 connected to external terminals 24. As shown, the Hall element is positioned in the air gap formed by poles 21, 22 so that the magnetic field is directed along an axis orthogonal to the input control current and output voltage axes of the Hall element. The Hall element lends itself to the modulation of a carrier frequency signal (A sin $\omega_c t$) by a modulating frequency signal (B sin $\omega_m t$). Thus, if the control current I varies as carrier frequency signal and H varies as the modulating frequency signal, $$V_H = K \cdot A \sin \omega_c t \cdot B \sin \omega_m t \qquad (6)$$

or $$V_H = \frac{KAB}{2}[\cos(\omega_c - \omega_m)t - \cos(\omega_c + \omega_m)t] \qquad (7)$$

The Hall output voltage is therefore composed of the sum and difference of the carrier and modulating frequency signals.

Hall effect elements and their associated electromagnetic structures are employed in the present invention to provide an improved single side band modulator system. The operational mode of one embodiment thereof is illustrated in FIG. 3 wherein first and second input signals are applied as respective inputs to a first multiplier means 30 and as respective inputs to first and second phase shift networks 31, 32. The outputs of these phase shift networks are connected as respective inputs to a second multiplier means 33. Each of the respective multiplier means 20, 33 produces a signal at its output which corresponds to the product of the input signals. These output signals are added or subtracted by the double pole, double throw polarity reversing switch 34 to produce the desired single side band signal at the output terminals 35.

The mode of operation of the system of FIG. 3 may be shown mathematically as follows: Assume the first and second input signals applied to the first multiplier 30 to be A sin $\omega_c t$ and B sin $\omega_m t$, respectively. Then, from Equation 7 the output of this multiplier is $$\frac{KAB}{2}[\cos(\omega_c - \omega_m)t - \cos(\omega_c + \omega_m)A]$$

The first and second input signals each phase shifted 90° are A cos $\omega_c t$ and B cos $\omega_m t$, respectively. These signals are applied as inputs to the second multiplier 33. Substituting in Equation 1

$$V_H = KA \cos \omega_c t \cdot B \cos \omega_m t \quad (8)$$

$$V_H = \frac{KAB}{2} [\cos(\omega_c - \omega_m)t + (\cos \omega_c + \omega_m)t] \quad (9)$$

If switch 34 is actuated to add the respective outputs of the multipliers 30 and 33, the system output signal at terminals 35 is $$V_{out} = KAB \cos(\omega_c - \omega_m)t \quad (10)$$

i.e., the lower sideband only having an amplitude double the magnitude of each of the multiplier outputs. If switch 35 is actuated to subtract the respective outputs of the multipliers 30, 33, the system output signal is $$V_{out} = KAB \cos(\omega_c + \omega_m)t \quad (11)$$

or the upper sideband only.

Figure 6:
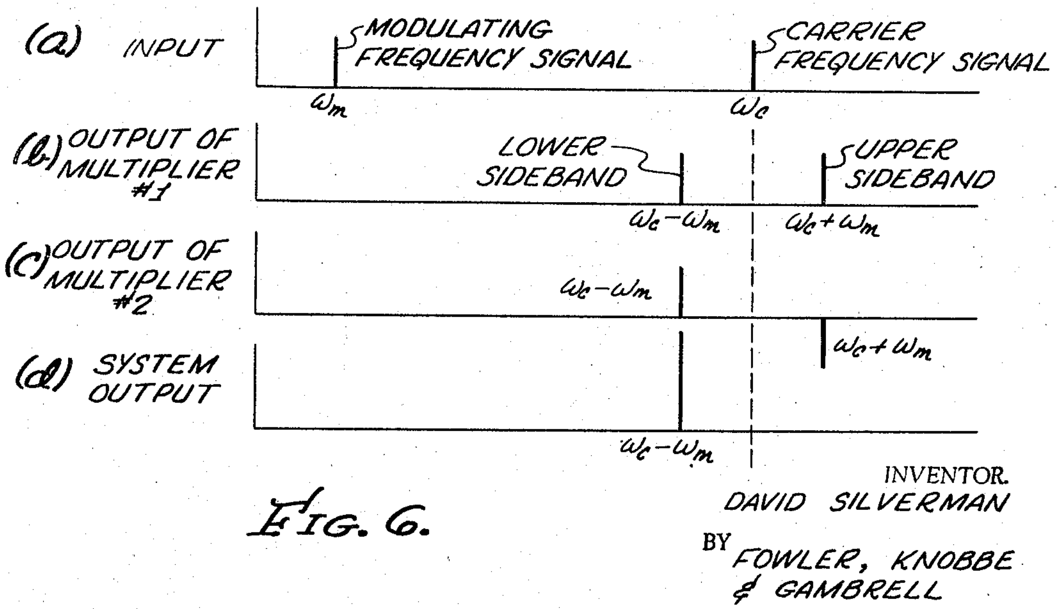

The operation of the system of FIG. 3 is further illustrated in FIGS. 6(*a*)–(*d*). Thus, FIG. 6(*a*) shows the respective first and second input signals, FIGS. 6(*b*) and (*c*) illustrate the upper and lower sidebands derived at the outputs of the first and second multipliers, and FIG. 6(*d*) illustrates the resultant single sideband signal derived by adding the multiplier outputs.

Figure 4:
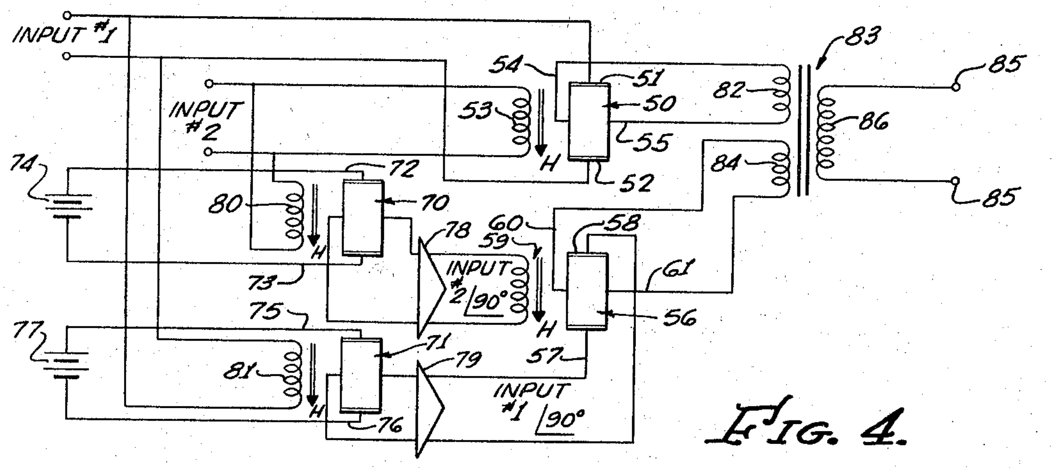
FIG. 4 is a detailed schematic of one embodiment of the present invention whose mode of operation corresponds to FIG. 3.

An embodiment of the present invention whose mode of operation corresponds to the block diagram schematic of FIG. 3 and the foregoing mathematical analysis is illustrated in FIG. 4. As shown, a first Hall device 50 includes input terminations 51, 52 connected to a first input signal and Hall voltage output terminations 54, 55. Hall device 50 further incorporates an associated electromagnetic means illustrated schematically as a coil 53 producing a flux density H directed orthogonal to the plane of the Hall element. This electromagnetic means is energized in accordance with a second input signal.

A second Hall element 56 includes input terminations 57, 58 energized in accordance with a signal corresponding to the first input signal phase shifted 90° and Hall voltage output terminations 60, 61. Associated with Hall element 56 is an electromagnetic means 59 energized by a signal corresponding to the second input signal phase shifted 90°. Both Hall element 50 and Hall element 56 utilize the Hall phenomena to produce an output signal at their respective output terminations corresponding to the product of the two variables, the control current I through the Hall element and the flux density vector H. Accordingly, the Hall voltage appearing at the output terminations 54, 55 of Hall element 50 represents the modulation product of the I and H variables as they are respectively varied in accordance with the first and second input signals. In like manner, the Hall voltage appearing at the output terminations 60, 61 of Hall element 56 represents the modulation product of its I and H variables as they are respectively varied in accordance with the first and second input signals each phase shifted 90°.

The 90° phase shift of the first and second input signals are obtained by third and fourth Hall elements 70, 71. Hall element 70 includes input terminations 72, 73 connected to a source of direct current 74. Likewise, Hall element 71 includes input terminations 75, 76 connected to direct current source 77. Hall elements 70, 71 are further associated with respective electromagnetic means 80, 81. Electromagnetic means 81 is connected to and energized by the first input signal. Similarly, electromagnetic means 80 is connected to and energized by the second input signal.

The output terminations of each of the Hall elements 70, 71 are connected to the input terminals of amplifiers 78, 79, respectively. The output terminals of amplifier 78 are connected to the electromagnetic means 59 of Hall element 56; likewise, the output terminals of amplifier 79 are connected to the input terminations 57, 58 of this same Hall element. In this manner, the reduction in signal magnitude through the Hall elements 70, 71 is compensated for by the amplifiers 78, 79 so that both multiplier elements 50, 56 are energized by input signals of comparable level.

Output terminations 54, 55 of Hall element 50 are connected to a first primary winding 82 of transformer 83. The output terminations 60, 61 of Hall element 56 are connected to a second primary winding 84 of this same transformer 83. The output signal of the modulator system at output terminals 85 of FIG. 4 is derived from a secondary winding 85 of this transformer 81.

The operation of the system shown in FIG. 4 is as follows: Hall elements 50, 56 function as multiplying elements in the manner described hereinabove to provide at output terminals 54, 55 the Hall voltage corresponding to the product of the I and H variables of element 50 as they are respectively varied in accordance with the first and second input signals and a Hall voltage at the output termination 60, 61 corresponding to the product of the I and H variables of element 56 as they are respectively varied in accordance with these input signals each phase shifted 90°. The Hall output voltages generated by the Hall elements 50, 56 represent the intermodulation of the respective signals applied thereto and each Hall voltage output contains both the upper and lower side bands, as shown mathematically in Equation 7.

Hall elements 70, 71 phase shift the input signals approximately 90°. This phase shift occurs because the magnetic flux ($\phi$) is related to the instantaneous value of the induced voltage 3 by the following equation $$e = N\frac{d\phi}{dt}$$

where N is the number of turns in the coil and $d\phi/dt$ is the rate of change of the flux in webers per second. For an applied sinusoidal voltage, the flux is 90° out of phase with the induced voltage since the derivative of a sine function is a cosine function. Referring now to the classic Hall voltage equation (Equation No. 1), the output Hall voltage will be in phase with the excitation flux density (and, therefore, 90° out of phase with the input voltage applied to the magnetic coil) when the control current does not vary with time. For this reason, the direct current sources 74, 77 are used for energizing the Hall elements 70, 71 respectively.

The phase shift provided by the Hall devices 70, 71 is not exactly 90° because of the resistance and capacitance in the electrical circuit. These effect the ability to completely cancel the unwanted sideband; however, a substantially high ratio between the desired and undesired sidebands can be obtained with contemporary high permeability magnetic materials.

Transformer 83 provides a means for algebraically adding the respective Hall output voltages of Hall elements 50, 56 while maintaining isolation between the Hall element outputs. Some means of isolation, such as transformer 83, is needed, for example, if one of the system input and one of the system output terminals are grounded, or if one of the output terminations of both elements 50, 56 is grounded. In addition, a reversing switch, as shown in FIG. 3, may be provided between either Hall multiplier and transformer 83 in order to select either the upper or lower sideband. The resulting output signal at output terminals 85 is the desired single side band modulation of the respective input signals as described hereinabove in conjunction with the block diagram schematic of FIG. 3.

Figure 5:
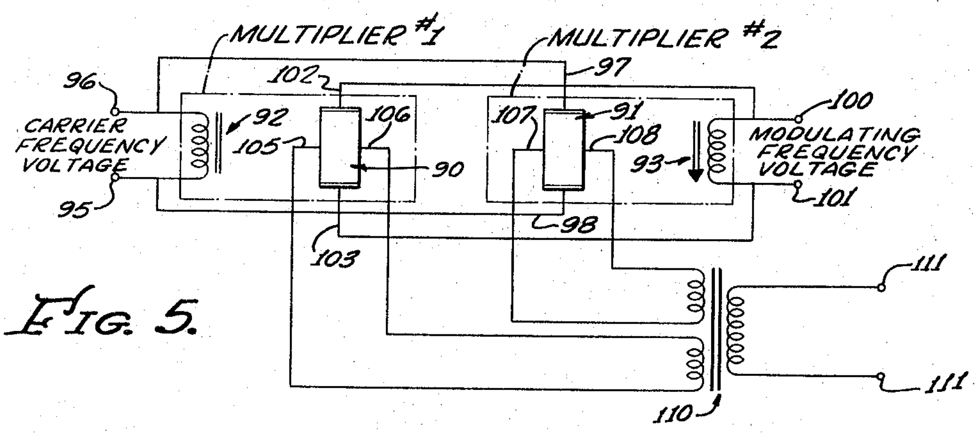
FIG. 5 is a detailed schematic of a preferred embodiment of the present invention; and FIGS. *6a*–*6d* graphically illustrate the upper and lower side bands produced by the multiplier Hall elements in each of the embodiments of FIGS. 4 and 5 and the manner in which a single sideband output is achieved.

A preferred embodiment of the present invention is shown in FIG. 5. This embodiment requires only the two Hall elements 90, 91, their associated electromagnetic circuits 92, 93 and necessary conductors for interconnecting the elements as shown. Thus, the carrier frequency voltage supplied to input terminals 95, 96 energizes the electromagnetic means 92 associated with Hall element 90 and is likewise connected to the input terminations 97, 98 of the other multiplier Hall element 91. The modulating frequency voltage applied to input terminals 100, 101 energizes the electromagnetic means 93 associated with Hall element 91 and is likewise connected to the input terminations 102, 103 of the other Hall element 90. The respective Hall voltage outputs provided at the output terminations 107, 108 of the other Hall element 91 are algebraically added by transformer 110 in the same manner as the embodiment of FIG. 4. The desired single side band modulation output signal is derived at the outputs 111 of the secondary winding of this transformer.

The substantial circuit simplification provided by the embodiment of FIG. 5 is achieved by utilizing the inherent phase shift in the multiplier Hall elements. Thus, it will be apparent that the magnetic flux through Hall element 90 produced by the carrier frequency voltage is 90° out of phase with the control current of the other Hall element 91 produced by the same carrier frequency voltage. The output of multiplier 90 is thus defined by the equation $$V_H = K \cdot A \cos \omega_c t \cdot B \sin \omega_m t \quad (12)$$

or $$V_H = \frac{KAB}{2} [\sin (\omega_c - \omega_m)t - \sin (\omega_c + \omega_m)t] \quad (13)$$

The output of multiplier 91 is defined by the equation $$V_H = K \cdot A \sin \omega_c t \cdot B \cos \omega_m t \quad (14)$$

or $$V_H = \frac{KAB}{2} [\sin (\omega_c - \omega_m)t + \sin (\omega_c + \omega_m)t] \quad (15)$$

By adding or subtracting these multiplier outputs, either the upper or lower sidebands may be selectively cancelled to provide the system output signals defined by Equations 10 and 11. Accordingly, the signal at the output terminals 111 of the system of FIG. 5 corresponds to either the upper or lower side band produced by the intermodulation of the carrier and modulating frequency voltages.

The present invention is particularly advantageous for use with single frequency modulating signals or only a very narrow band of frequencies, since one of the modulator outputs varies inversely with the signal frequency. This is so because of the inherent change in inductive impedance with frequency of the magnetic field generating means which decreases signal magnitude applied to the Hall element for increased frequencies and increases the signal magnitude for lower frequency signals. Accordingly, the Hall element whose associated magnetic circuit is connected to the modulating frequency voltage produces a Hall voltage which varies inversely with frequency. As the signal band is increased this inherent frequency dependence allows the undesired sideband to appear on the output of the modulator system. Accordingly, the present invention is particularly advantageous when the modulating frequency voltage comprises a discrete frequency or narrow band of frequencies. A specific example of one such application is a pulse code modulation system wherein the modulator system of the present invention is used to provide a single tone output signal. Plural modulators may be driven from a common carrier frequency source to provide a plurality of pulsed output tones each derived from the common carrier.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:

1. A single sideband modulator system including first and second Hall multiplier devices each comprising a Hall device having a thin film semiconductor element which exhibits the Hall phenomena, input terminations attached to said semiconductor element for passing a control current along a first axis of said element, output terminations attached to said semiconductor element on a second axis orthogonal to said first axis, and means for establishing a magnetic field through said semiconductor element along a third axis orthogonal to said first and second axes, the Hall voltage output at said output terminations varying in accordance with the product of two variables represented by said control current and said magnetic field;

means for connecting first system input terminals to input terminations and second system input terminals to magnetic field means of said first multiplier device;

first and second means for phase shifting approximately 90° system input signals applied to said first and second system input terminals, each phase shift means comprising first and second Hall devices each comprising a thin film semiconductor element which exhibits the Hall phenomena, input terminations attached to said semiconductor element for passing a control current along a first axis of said element, output terminations attached to said semiconductor element on a second axis orthogonal to said first axis, and means for establishing a magnetic field through said semiconductor element along a third axis orthogonal to said first and second axes, means for connecting said first system input terminals to the magnetic field producing means of said first phase shift means and said second system input terminals to the magnetic field producing means of said phase shift means, and means for respectively connecting the output terminations of said phase shift means to the input terminations and magnetic field means of said second multiplier device; and means coupled to the respective output terminations of said first and second Hall multiplier devices for algebraically adding their respective Hall output voltages.

2. The single sideband modulator system of claim 1 comprising means for supplying a substantially constant control current to the input terminations of said phase shift Hall elements.

3. The single sideband modulator system of claim 1 wherein said means for respectively connecting the output terminations of said phase shift means to the input terminations and magnetic field means of said second multiplier device couples the output terminations of said first phase shift means to the input terminations of said second multiplier device and couples the output terminations of said second phase shift means to the magnetic field means of said second multiplier device.

4. The single sideband modulator system of claim 1 wherein said means for respectively connecting the output terminations of said phase shift means to the input terminations and magnetic field means of said second multiplier device includes amplifier means for compensating for the signal reduction through said phase shift means.

5. A single sideband modulator system for intermodulating carrier frequency and modulating frequency signals comprising first, second, third, and fourth Hall elements each including input terminations for passing a control current along a first axis of said element and output terminations on a second axis orthogonal to said first axis;

first, second, third, and fourth electromagnetic means, each including a magnetic core and associated electrical winding for establishing respective magnetic fields through said first, second, third, and fourth elements along a third axis orthogonal to said first and second axes;

means for energizing the input terminations of said first Hall element and the electromagnetic means of said fourth Hall element in accordance with the carrier frequency voltage;

means for energizing the electromagnetic means of said first Hall element and the electromagnetic means of said third Hall element in accordance with the modulating frequency voltage;

means for coupling the output terminations of said third Hall element to said second electromagnetic means;

means for coupling the output terminations of said fourth Hall element to the input terminations of said second Hall element; and means coupled to the respective output terminations of said first and second Hall elements for algebraically adding the respective Hall output voltages.

References Cited by the Examiner

UNITED STATES PATENTS

| | | | |
|---|---|---|---|
| 2,545,369 | 3/1951 | Millar | 307—88.5 |
| 3,050,698 | 8/1962 | Brass | 330—6 |
| 3,122,715 | 2/1964 | Buck | 332—44 X |
| 3,221,273 | 11/1965 | Livingston | 329—200 X |
| 3,225,316 | 12/1965 | Saraga | 332—51 |

ROY LAKE, *Primary Examiner.*

A. L. BRODY, *Assistant Examiner.*